United States Patent [19]

Heidemann

[11] Patent Number: 4,523,765
[45] Date of Patent: Jun. 18, 1985

[54] HIGH PRESSURE SEALING MEANS FOR LONGITUDINALLY MOVABLE PARTS OF DEEP-WELL DRILLING TOOLS

[75] Inventor: Gerhard Heidemann, Celle, Fed. Rep. of Germany

[73] Assignee: Norton Christensen, Inc., Salt Lake City, Utah

[21] Appl. No.: 604,242

[22] Filed: Apr. 26, 1984

[30] Foreign Application Priority Data

Jun. 7, 1983 [DE] Fed. Rep. of Germany ....... 3320515

[51] Int. Cl.³ .............................. F16J 9/05; F16J 5/24
[52] U.S. Cl. .................................................. 277/165
[58] Field of Search ....................... 277/164, 165, 177

[56] References Cited

U.S. PATENT DOCUMENTS

| | | | |
|---|---|---|---|
| 3,397,928 | 8/1968 | Galle | 308/8.2 |
| 3,606,356 | 9/1971 | Beroset | 277/165 |
| 4,151,999 | 5/1979 | Ringel et al. | 277/165 |
| 4,244,280 | 1/1981 | Stoll | 277/165 |

FOREIGN PATENT DOCUMENTS

| | | | |
|---|---|---|---|
| 249400 | 1/1964 | Australia | 277/165 |
| 522024 | 6/1940 | United Kingdom | 277/165 |

Primary Examiner—Robert I. Smith
Attorney, Agent, or Firm—Walter Fred

[57] ABSTRACT

A high-pressure sealing means for two parts of deep-well drilling tools which are longitudinally movable in relation to one another consists of a wearing sealing ring (7) which is disposed in an annular groove in a first part (1) and bears against the second part (2) and prestressed radially by a pressure ring (14). The wearing sealing ring (7) has a wall surface (13) extending substantially over its axial length, which seals against the second part (2). Moreover the ring (13) is smaller than the width of the annular groove (3) of the first part (1) receiving it and is displaceable between the two sides (4,5) of the annular groove for the selective formation of a static sealing surface at one of the sides (4,5) of the annular groove. The pressure ring (14) is formed from elastomer material, has a large volume, and is gripped, compressed and deformed between the wall surface (10) of the wearing sealing ring (7) situated opposite the sealing wall surface (13) and the bottom (6) of the annular groove.

7 Claims, 3 Drawing Figures

HIGH PRESSURE SEALING MEANS FOR LONGITUDINALLY MOVABLE PARTS OF DEEP-WELL DRILLING TOOLS

TECHNICAL DISCLOSURE

The invention relates to high pressure sealing means for parts displaceable relative to one another, which has a reliable service life comparable to that of deep well drilling tools in the field and which makes special allowance for marginal conditions that occur there.

BACKGROUND OF THE INVENTION

Deep-well drilling tools having parts which are movable for longitudinal displacement in relation to one another require a moving contact sealing means between the parts, which prevents penetration of drilling fluid into an interior annular chamber of the tool, filled with oil, for example. The differential pressure occurring at such sealing means depends not only on the pressure drop of the drilling fluid on its way from the inner circulation compartment of the drilling string through the further tools disposed below the tool parts which are longitudinally displaceable into the annular space of the well but also on the dynamic pressure of the oil in the inner annular chamber which builds up because of the delay in equalization of the volume of oil through narrow equalization passages on longitudinal displacement of the parts. The differential pressure may additionally depend on the size of tool, the viscosity of the oil as well as the temperature and may reach values of up to 1000 bar.

Results from the field use of deep-well drilling tools show that defects appearing at the high-pressure sealing means between the parts which are movable for longitudinal displacement must be regarded as the main cause of the premature failure of these tools. Accordingly, numerous attempts have been made to use in deep-well drilling moving contact sealing means of the most varied configuration and nature of material, which have proved satisfactory in other fields of application. Field trials using such sealing means did not, however, lead to an increase in service life.

It is therefore an object of the present invention to provide a high-pressure sealing means for parts which are movable for displacement in relation to one another, which achieves a service life corresponding to the life of conventional drilling tools, under field conditions in deep-well drilling tools, making special allowance for the marginal conditions which occur here.

SUMMARY OF THE INVENTION

The present invention is a high-pressure sealing means for two longitudinally movable parts of deep-well drilling tools, comprising a wearing sealing ring disposed in an annular groove of a first part and bearing against a second part, and a pressure ring which prestresses the wearing ring radially, the sealing ring having a wall surface extending substantially over its axial length, which seals against the second part, and being narrower than the width of the annular groove is displaceable between the two sides of the annular groove for the selective formation of a static sealing surface at one of the sides of the annular groove, and the pressure ring being formed from a tightening and sealing ring of elastomer material which has a large volume in relation to the space in which it is located and can be compressed radially, the pressure ring being compressed between the wall surface of the sealing ring situated opposite the sealing wall surface and the bottom of the annular groove.

As a result of the axial length of the sealing wall surface of the sealing ring, a long sealing distance results and thus high security against partial leakage points such as are caused by surface roughness of the longitudinally movable part to be sealed and furrows inside the sealing ring. In addition, the pressure drop from the high pressure region to the low pressure region is kept comparatively small in relation to an axial linear differential. The necessary pressure per unit of area can therefore be reduced in comparison with that of conventional sealing means so that the heating inside the material of the sealing means caused by friction is reduced. As a result of the slight self-heating, use at extreme drilling depths with temperatures of up to 240° C. is therefore also possible. As a result of the axial undersize of the sealing ring, this can move inside the annular groove and bear against the particular side remote from the high-pressure region. In this manner, the high pressure can also enter the annular groove itself and be effective at the wall surface of the sealing ring situated opposite the sealing wall surface. Whereas the partial pressure at the sealing wall surface drops continuously axially, it remains constant at the opposite, exposed wall surface and produces a radial pressure reinforcing the contact pressure of the sealing wall surface through the pressure difference increasing axially from the edge. At the same time, an axial pressure on the pressure ring is caused in relation to the groove wall which similarly leads to an increase in the radial contact pressure as a result of the reaction forces occurring. The arrangement therefore has the contact pressure of the sealing ring controlled depending on the differenetial pressure present.

As a result of the parallel course of the two sides of the annular groove in relation to the sides of the sealing ring, a sealing action results in both axial directions. The inclination of the sides towards the bottom of the groove, according to a further embodiment, additionally reinforces the radial pressure of the sealing surface of the sealing ring by component resolution of the action of axial pressure. In addition, as a result of this groove formation, an erroneous mix-up of the parts during the mounting or servicing is also avoided. The annular grooves, preferably of V-shaped cross-section, let into the sealing wall surface of the sealing ring, serve to receive particles of dirt which are contained in the abrasive circulation fluid and, while they sometimes cling to the second part as a result of unavoidable surface roughness thereof, they can be partially crossed over by the sealing wall surface. The combination of these annular grooves with the long sealing wall surface also renders possible, over a relatively small axial distance, a sealing action such as could only be attempted to be achieved with conventional sealing means by a multiple arrangement thereof, in cascade. As a result, a considerably cheaper manufacture and maintenance results or alternatively a considerably higher reliability and longer service life for the same expenditure.

The rounding of the transition of the sides to the bottom of the groove, carried out according to one preferred embodiment, renders possible a better contact for the pressure ring and a better support against the action of axial pressure so that the prestressing and the additional action of pressure can be deliberately converted into a radial pressure of the sealing ring. The pressure ring is preferably an elastomer O-ring which is compressed by up to 40% of its radial thickness. This value corresponds to more than double the deformation usual in the sealing art and causes a prestressing force which is about five times greater and which results from the more or less quadratic dependence between elastic deformation and prestressing force. The cross-sectional area of the pressure ring is of substantially the same order of magnitude as the sealing ring.

The development according to the invention provides a high, reliable wearing and deformation volume of the sealing ring and, in the event of radial offsetting of the parts mounted for longitudinal displacement, such as frequently occurs in drilling operation as a result of severe bending load and alternating bending load on the pipe, it renders possible a spatial adaptation of the sealing surface to this offsetting and at the same time achieves a very short adjustment time. As a result, the sealing action is retained even with abrupt radial displacements.

The wear at the moving wall surface, consciously included in the action principle of the sealing means, is intended to remove furrows, for example, which result from roughness of the surface of the other part, and during the travel through of abrasive particles, by roughing down the rest of the material. The prestressing force in conjunction with the size of the wall surface and the resistance to wear of the material of which the sealing ring consists, render possible the achievement of a life such as is aimed at, at present, for all drilling tools which are liable to wear. With the present-day materials, this value is about 200 to 500 hours. PTFE (polytetrafluoroethylene) has provided a suitable material for the sealing ring.

An embodiment of the present invention will now be described, by way of example, with reference to the accompanying drawings:

DESCRIPTION OF THE PREFERRED EMBODIMENT(S)

Figure 1:
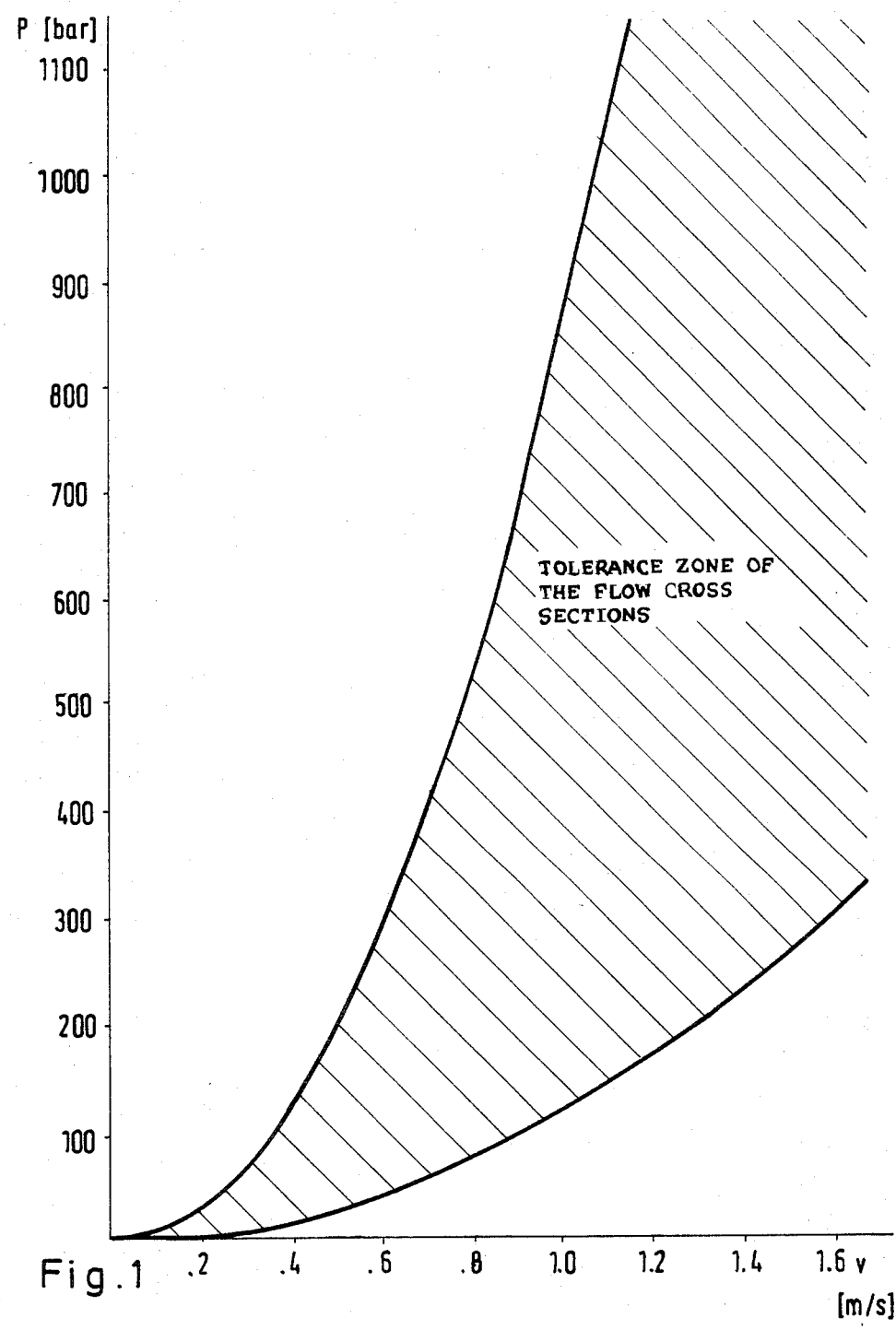
FIG. 1 shows a graph of pressure against speed of two parts of a drilling tool which are movable longitudinally.

The graph illustrated in FIG. 1 shows the curve of the pressure P at the high-pressure sealing means during a longitudinal displacement at a velocity v between the inner and outer parts of a shock absorber of 11.25" diameter or size. This pressure results from the effort of the oil filling to bring about an equalization of volume, through narrow equalization passages, particularly within the splined region necessary for the transmission of torque and the stabilizer regions of the drilling tool. The tolerance zone or field shown hatched results from the influence of viscosity and temperature of the oil filling and partly also from manufacturing tolerances and wear inside the drilling tool.

Figure 2:
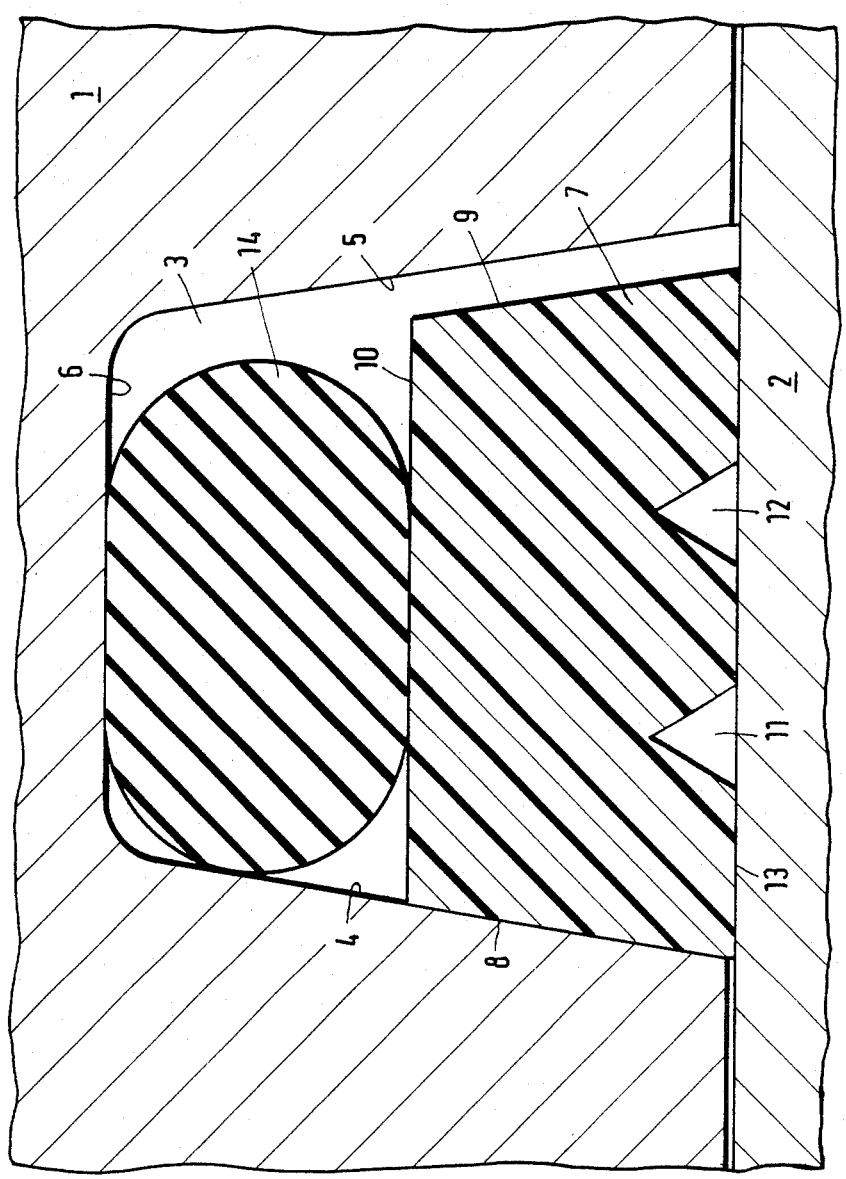
FIG. 2 shows a preferred embodiment of the invention as a partial longitudinal section of a drilling tool.

FIG. 2 shows, as a partial longitudinal section, an outer part 1 and an inner part 2 which is movable longitudinally in relation thereto. Let into the outer part 1 is an annular trapezoidal shape groove 3, the sides 4 and 5 of which converge towards the bottom 6 of the groove at an angle of about 80° to the longitudinal axis. The bottom 6 has a cylindrical surface that merges concavely curved or rounded, into the sides 4 and 5. The region of the annular groove 3 adjacent the inner part 2 contains a sealing ring 7, which is axially shorter than the axial spacing of the groove sides 4 and 5 and is made preferably of PTFE (polytetrafluoroethylene) or another suitable resilient wear and heat resistant organic polymeric material. This sealing ring 7 has sides 8 and 9 extending parallel to the sides 4 and 5 of the groove 3, a cylindrical outer wall surface 10 and a cylindrical inner wall surface 13, which bears against the inner part 2 and serves as a sealing surface, interrupted by two annular V-shape grooves 11 and 12. Between the bottom 6 of the groove and the outer wall surface 10 of the sealing ring 7 is provided a sealing pressure ring 14 in the form of an elastomer O-ring. When new, this ring 7 is compressed about 40% of its original radial thickness or diameter to a generally oval or oblong shape in cross-section.

Figure 3:
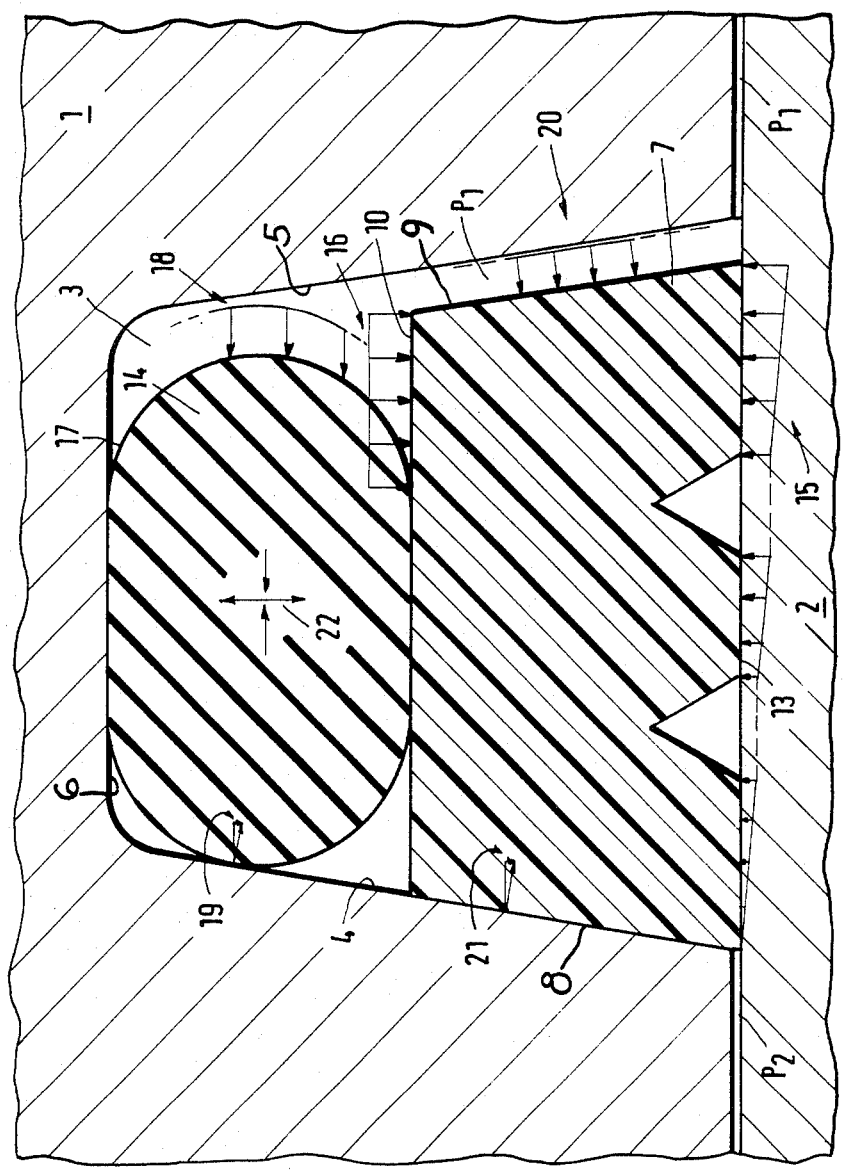
FIG. 3 is a diagrammatic sketch similar to FIG. 2 illustrating the pressure potential and the forces acting as a result of the admission of pressure.

FIG. 3 illustrates the pressure and force relationships of a high-pressure sealing means as shown in FIG. 2. It is initially assumed that the pressure P1 at the right in the drawing is considerably higher than the pressure P2 at the left in the drawing. As a result, in the first instance, the sealing ring 7 and the pressure ring 14 bear against the left-hand side 4 of the annular groove 3 and form a static sealing means. The moving sealing means between the wall surface 13 of the sealing ring 7 and the inner part 2 forms the particularly critical region. It is first assumed that the pressure drop occurring along this sealing surface extends substantially linearly along the axis of the tool, as illustrated at 15 below the inner wall surface 13. As a result of the short axial length of the sealing ring 7, the higher pressure P1 can also be effective in the annular groove 3 and exert a force on the outer wall surface 10 of the sealing ring 7 as illustrated at 16. Since this pressure is constant as far as the contact surface of the pressure ring 14 with the outer wall surface 10 of the sealing ring 7, a pressing of the sealing ring 7 against the inner part 2 occurs here and increases in the direction towards the left, this pressure resulting from the difference in the partial pressures illustrated by the arrows at 15 and 16. At the same time, the pressure P1 also acts at the right-hand exposed surface 17 of the ring 14, as the partial illustration 18 shows, and urges this against the left-hand side 4 of the annular groove 3.

As a result of this reaction force, a force 22 is generated which tries to convert the oval or oblong cross-setional shape of the pressure ring 14 back into a round; and as a result of the bevelling of the side 4, produces an additional radial component force as illustrated at 19. As a result, both forces exert an additional radial force on the sealing ring 7, apart from the inherent resilience of the ring 14, which radial force particularly reinforces its pressure against the inner part 2 in the region lying further to the left in the drawing. Finally, the pressure exerted on the right-hand side 9 of the sealing ring 7 as illustrated at 20, is similarly converted into a radial force as illustrated at 21 by the support of the sealing ring 7 against the left-hand side 4 of the annular groove 3, and contributes to a further increase in the bearing force depending on pressure.

The wear of the sealing ring 7 which occurs thus represents a function of the pressure differential acting on it, as a result of which an optimum adaptation to the operating conditions is achieved. To obtain a particularly long life, therefore, the invention can also be used to advantage where the pressure differentials do not reach the 1000 bar value previously given.

I claim:

1. A high-pressure sealing means for two relatively longitudinally movable parts of deep-well drilling tools, comprising: a wearing sealing ring of resilient, wear and heat resistant organic polymeric material disposed in an annular groove of substantially trapezoidal cross-sectional shape with two inclined sides that converge towards the bottom of the annular groove in a first part of a drilling tool and bearing against a second part of the drilling tool and the sealing ring having inclined sides extending parallel to and adjacent the inclined sides of the annular groove and a sealing wall surface extending substantially over its axial length, which seals against the second part, is narrower than the width of the annular groove and displaceable between the two inclined sides of the annular groove for the selective formation of a static sealing surface at one of the inclined sides of the annular groove; and a pressure ring which prestresses the wearing sealing ring radially, being formed from a tightening and sealing ring of resilient elastomer material which has a large volume in relation to space remaining in the annular groove in which it is located and which can be and is compressed and deformed radially between an opposite wall surface of the sealing ring situated opposite the sealing wall surface and the bottom of the annular groove.

2. A high pressure sealing means according to claim 1 wherein the sealing ring further comprises: annular grooves in and interrupting the sealing wall surface bearing against the second part.

3. A high pressure sealing means according to claim 2, wherein the annular grooves in the sealing ring are V-shaped in cross-section.

4. A high pressure sealing means according to claim 1 further comprising: rounded merging surfaces joining the inclined sides and the bottom of the annular groove in the first part.

5. A high pressure sealing means according to claim 1 wherein the first part including the annular groove and the wearing sealing ring therein surrounds the second part.

6. A high pressure sealing means according to claim 1 wherein the pressure ring is constructed in the form of an O-ring having a cross-sectional area of the same order of magnitude as an initial new and unworn sealing ring, preferably between 50% and 100% of the cross-sectional area of the latter, and is compressed and deformed radially by about 40% of its original cross-sectional thickness when installed.

7. A high pressure sealing means according to claim 1 wherein the wearing sealing ring is made of polytetrafluoroethylene (PTFE).

* * * * *